May 12, 1931. A. H. STEBBINS 1,804,958
CRANK ARM BEARING
Filed March 21, 1928
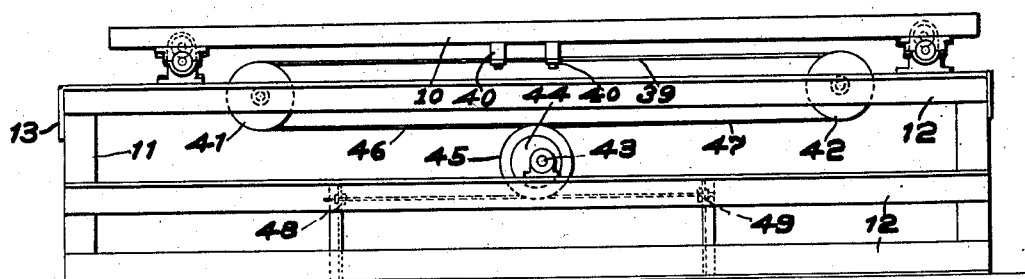
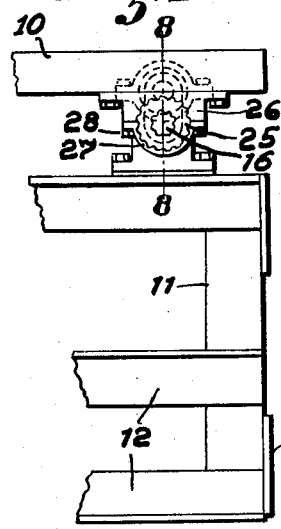
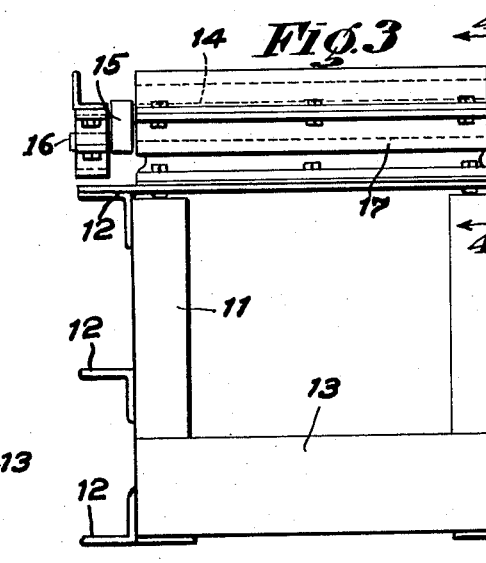
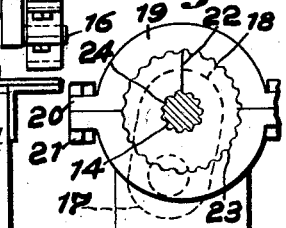
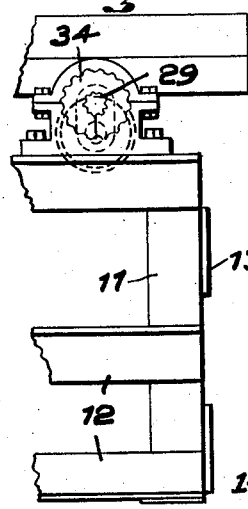
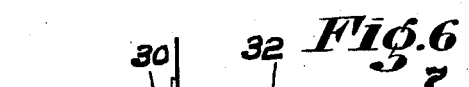
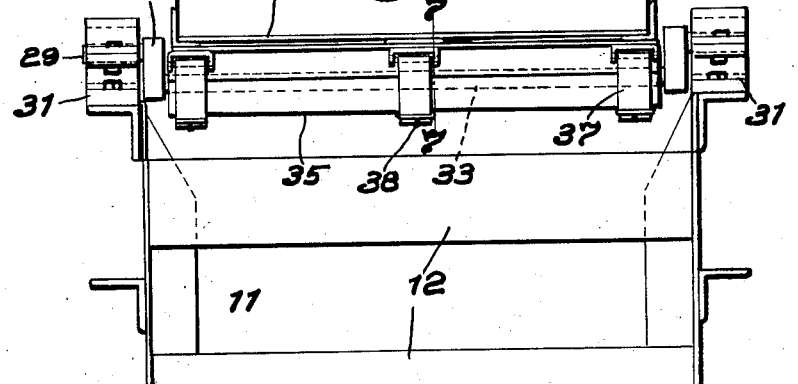
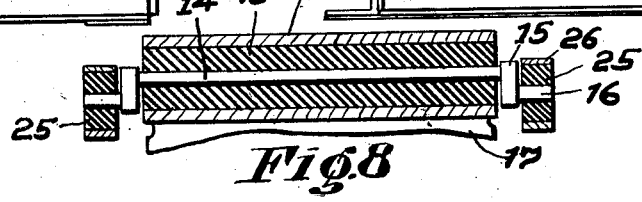
INVENTOR:
Albert H. Stebbins
BY Robt P Harris
ATTORNEY Patented May 12, 1931

1,804,958

UNITED STATES PATENT OFFICE

ALBERT H. STEBBINS, OF LOS ANGELES, CALIFORNIA

CRANK ARM BEARING

Application filed March 21, 1928. Serial No. 263,366.

This invention relates to a non-metallic resilient bearing for rocking arms, and more particularly to a novel form of bearing for the crank arms employed to support vibratory frames for back and forth movement.

Crank arms are commonly employed to suspend concentrator decks and other forms of vibratory frames from fixed supporting frames for vibratory movement. These crank arms are provided with laterally extending shafts that are journaled in bearing brackets secured to the fixed frame and vibrating frame respectively to support the vibratory frame. The metal bearings employed heretofore for the shafts of these crank arms tend to wear out rapidly, due largely to the difficulty of excluding the dirt and dust produced by the operating machines from the bearings. Furthermore, since these crank arms usually swing through only a small angle, practically the entire bearing wear occurs upon a small portion of the cooperating parts.

Having in mind the foregoing the present invention relates to a non-metallic resilient pad adapted to receive and snugly embrace a shaft of the crank arm so that the turning movement of the shaft within the pad will be absorbed by the yielding material of the pad without causing the shaft to rotate in the pad as a journal. As a result of this construction rotative movement between the shaft and surface of the pad engaging the shaft is avoided, thus eliminating wear between these parts, and a smooth quiet bearing is provided that does not need to be lubricated.

The above and other features of the invention will be clear from the following description when read in connection with the accompanying drawings showing good practical embodiments of the invention.

In the drawings—

Fig. 1 is a side elevation of a machine provided with rocking crank arms having bearings constructed in accordance with the present invention;

Fig. 2 on an enlarged scale is a side view of an end portion of the machine shown in Fig. 1;

Fig. 3 is an end view of the machine shown in Fig. 1;

Fig. 4 is a sectional view taken on the line 4—4 of Fig. 3;

Fig. 5 is a view similar to Fig. 2, but shows a modified form of the invention;

Fig. 6 is an end view of the machine of Fig. 5;

Fig. 7 is a sectional view taken on the line 7—7 of Fig. 6; and

Fig. 8 is a vertical sectional view through the shaft supporting mechanism of Fig. 3.

The crank shaft bearing forming the subject matter of the present invention may be employed in various constructions where a crank arm is employed that rocks through a relatively small angle. In the embodiment of the invention shown in Figs. 1 to 4 inclusive and in Fig. 8 the crank arm bearings are shown as associated with the crank arms employed to support the vibratory frame 10 upon a fixed supporting frame so that the vibratory frame may move back and forth in the direction of its length. The fixed frame is shown as having the uprights 11 to which the longitudinally extending rails 12 are secured, and the uprights 11 are connected by the transversely extending braces 13.

The vibratory frame 10 may serve to support a concentrator deck, screen, or other form of mechanism employing a vibratory movement.

The means shown for supporting the vibratory frame for back and forth movement in the direction of its length consists of the transversely extending shafts 14 disposed near the opposite ends of the frame 10 and these shafts are provided at their opposite ends with the downwardly extending crank arms 15, and each crank arm 15 is provided near its lower end with a laterally extending stub shaft 16. The shaft 14, in the construction shown in Figs. 1 to 4 inclusive and in Fig. 8 is supported in a relatively long bracket 17 the base of which is rigidly secured to the fixed supporting frame. The upper face of the bracket 17 is given a semi-circular trough-shaped construction adapted to receive a cylindrical roll or pad 18 formed of non-metallic resilient material such as rubber, and this roll or pad is secured within the trough-shaped portion of the bracket 17 by the curved cover plate 19 having the laterally extending flanges 20 through which bolts 21 may be inserted to secure the cover plate to the bracket 17. The roll or pad 18, if formed of rubber, may be molded about the shaft 14, or if desired this tubular roll 18 may be split along the line 22 so that the same may be opened up to receive the shaft 14. The roll or pad 18 may extend throughout the length of the supporting bracket 17, or it may be replaced by two or more short rolls or pads housed within the bracket and cover plate just described, the construction, however, should be such that the roll or pad is snugly embraced by its metal housing so that the pad 18 is prevented from twisting or turning therein, and to this end the inner walls of the housing may be provided with ribs 23 adapted to project into the surface of the pad 18 sufficiently to prevent the pad from turning within its supporting housing. Likewise, the shaft 14 should be prevented from turning within the central bore of the pad 18 and this may be accomplished by providing the shaft with the ribs or flutes 24 which will project into the surface of the shaft supporting material 18.

As a result of the construction just described the shaft 14 will be prevented from rotating within the bore of the pad 18, but when rocking movement is imparted to the shaft the turning movement of the shaft in the pad will be absorbed by the yielding material of which the pad is constructed. This will prevent relative movement from occurring between the shaft and the supporting surface engaging the same, and will eliminate wear between these parts, and will produce a smooth, quietly operating bearing that does not need to be lubricated.

The bearings in which the stub shafts 16 are mounted may also be formed of non-metallic resilient material such as rubber and may constitute disks or pads 25 adapted to snugly embrace the stub shafts 16. These pads are housed within the brackets 26 that are secured to the under face of the vibratory frame 10, and the pads are clamped within the brackets 26 by the semi-circular straps or cover plates 27 that are secured to the brackets 26 by the bolts 28. The construction should be such that the pad 25 is prevented from turning within its housing or bracket 26 and the stub shaft 16 should be prevented from rotating within the bore of the pad 25, and to this end the shaft 16 and inner face of the bracket 26 may be fluted as shown.

In many constructions it is desired to impart only a relatively short back and forth movement to the vibratory frame 10 in which case the rocking movement imparted to the crank shafts 15 will be quite small, and as a result the yielding material in which the shafts 14 and 16 are mounted will readily absorb the slight twisting or turning movement to which these shafts are subjected as the vibratory frame moves back and forth. As a result of this construction the vibratory frame 10 is supported for back and forth movement without employing rotating parts that require to be lubricated, or will be injuriously affected by the dirt and dust produced by the operating machine.

In, the construction so far described the relatively long central shaft 14 is supported by the fixed machine frame, and the vibratory frame rests upon the stub shaft 16. In some constructions however it may be desirable to employ the arrangement of parts disclosed in Figs. 5, 6 and 7, in which the stub shafts 29 of the crank arms 30 are supported by brackets 31 mounted upon the machine frame, and the vibratory frame 32 rests upon the relatively long transversely extending shaft 33. In this modified construction the stub shafts 29 are mounted within the pads 35 formed of rubber or other non-metallic yielding material and the shaft 33 is mounted in one long or two or more short tubular pads 35 formed of rubber or other resilient material. The pad 35 is shown as mounted in the trough-shaped bracket 36 which is rigidly secured to the under face of the vibratory frame 32 and the pad is firmly secured to this bracket by the straps 37 having the buckle or other securing means 38.

The means shown for imparting vibratory movement to the frame 10 in the direction of its length consists of the cable 39 an intermediate portion of which is rigidly secured to the under face of the frame 10 by the clamps 40. The portion of the cable 39 that extends in a left-hand direction from the clamps 40 is looped about an idle sheave 41 journaled upon the fixed supporting frame, and the portion of the cable that extends in a right-hand direction from the clamps 40 is looped about a similar idle sheave 42 journaled upon the supporting frame. Below the vibratory frame 10 is provided the power shaft 43 which extends transversely of the fixed supporting frame and is journaled in suitable brackets carried by this frame. This shaft is rotated by a pulley or other means not shown and is provided with an eccentric 44 which is constructed to rotate in the grooved sheave 45. One end portion 46 of the cable is looped about the right-hand side of the sheave 45 and the other end portion 47 of this cable is looped about the left-hand side of the sheave 45 and the ends of these cables are anchored to the supporting frame as indicated at 48 and 49. The operation of the construction just described is such that as the power shaft 43 is rotated it will rotate the eccentric 44 within the sheave 45 and this will move the sheave 45 in an orbital path with the result that the end portions 46 and 47 of the cable will be alternately tensioned and slacked off and this will pull the vibratory deck back and forth to impart the desired movement to the same.

The non-metallic resilient bearing forming the subject matter of the present invention may be employed in various constructions where the operating shaft is required to turn through only a small angle, but it is particularly well adapted for use upon vibratory machines employed to treat dust producing materials, since this form of bearing will not be injured by dust and fine granular particles that are destructive to the usual metallic bearing.

What is claimed is:—

1. In a machine of the class described, in combination, a vibratory frame, a fixed supporting frame, and means for movably supporting the vibratory frame upon the fixed frame, comprising crank arms for supporting the vibratory frame in a suspended condition and having laterally extending shafts near their opposite ends, a non-metallic resilient pad snugly mounted upon each shaft, projections upon the shafts for non-rotatively engaging the bore of the pads, and housings having pad gripping projections and constructed to non-rotatably secure one pad of each crank arm to the fixed frame and the other pad of each crank arm to the vibratory frame so that the turning movement of the shafts in the pads will be absorbed by the yielding material of the pads without causing the shafts to rotate in the pads as journals.

2. In a machine of the class described, in combination, a vibratory frame, a fixed supporting frame, and means for movably supporting the vibratory frame upon the fixed frame, comprising crank arms for supporting the vibratory frame in a suspended condition and having laterally extending shafts near their opposite ends, a non-metallic resilient pad snugly mounted upon each shaft, projections upon the shafts for non-rotatively engaging the bore of the pads, and split housings adapted to be snugly clamped about the pads and constructed to non-rotatably secure one pad of each crank arm to the fixed frame and the other pad of each crank arm to the vibratory frame so that the turning movement of the shafts in the pads will be absorbed by the yielding material of the pads without causing the shafts to rotate in the pads as journals.

3. In a machine having a vibratory frame, mechanism for suspending the vibrating frame from a fixed supporting frame for vibratory movement, comprising crank arms provided with laterally extending shafts near their opposite ends and arranged to support the vibratory frame in a suspended condition for back and forth movement, a non-metallic resilient pad snugly mounted upon each shaft so as to prevent rotation of the shaft in the pad as a bearing, means for non-rotatably securing one shaft receiving pad of each crank arm to the fixed frame and for non-rotatively securing the other shaft receiving pad of each crank arm to the vibratory frame so that the turning movement of the shafts in the pads incident to the frame vibration will be absorbed by the yielding material of the pads without causing the shafts to rotate in the pads as journals.

In testimony whereof, I have signed my name to this specification.

ALBERT H. STEBBINS.